US012732756B2

(12) United States Patent
Borders

(10) Patent No.: US 12,732,756 B2
(45) Date of Patent: Sep. 8, 2026

(54) CAPACITIVE TRANSDUCER

(71) Applicant: Ex Machina Soundworks, LLC, Brooklyn, NY (US)

(72) Inventor: Paulo De Lucia De Forest Dear Borders, Long Island City, NY (US)

( * ) Notice: Subject to any disclaimer, the term of this patent is extended or adjusted under 35 U.S.C. 154(b) by 0 days.

(21) Appl. No.: 19/022,185

(22) Filed: Jan. 15, 2025

(65) Prior Publication Data

US 2025/0234138 A1 Jul. 17, 2025

Related U.S. Application Data

(60) Provisional application No. 63/621,451, filed on Jan. 16, 2024.

(51) Int. Cl.
*H04R 19/04* (2006.01)
*H04R 7/18* (2006.01)

(52) U.S. Cl.
CPC ............... *H04R 19/04* (2013.01); *H04R 7/18* (2013.01); *H04R 2410/03* (2013.01)

(58) Field of Classification Search
CPC ............ H04R 19/005; H04R 2201/003; H04R 31/00; H04R 19/00; H04R 23/00; H04R 19/04; H01L 2224/48137; H01L 2924/16152; H01L 2224/48091; H01L 2924/15151; H01L 2924/00014; B81B 3/0021; B81B 3/0072; B81B 3/0094; B81B 2201/0235; H10D 99/00
See application file for complete search history.

(56) References Cited

U.S. PATENT DOCUMENTS

| | | | | |
|---|---|---|---|---|
| 8,238,587 | B2 * | 8/2012 | Yuasa | H04R 19/016 381/361 |
| 10,390,145 | B1 * | 8/2019 | Hsieh | H04R 19/04 |
| 11,671,763 | B2 * | 6/2023 | Grigg | H04R 19/016 381/113 |
| 2003/0174850 | A1 * | 9/2003 | Gullov | H04R 19/00 381/174 |
| 2006/0230835 | A1 * | 10/2006 | Wang | H04R 19/00 73/718 |
| 2007/0113664 | A1 * | 5/2007 | Wang | H04R 19/005 73/718 |
| 2011/0075866 | A1 * | 3/2011 | Zhang | H04R 19/04 381/174 |
| 2017/0029268 | A1 * | 2/2017 | Chang | B81B 3/0013 |
| 2019/0160491 | A1 * | 5/2019 | Biateau | B06B 1/0292 |
| 2022/0280972 | A1 | 9/2022 | Liu | |
| 2022/0286786 | A1 | 9/2022 | Chou | |
| 2023/0027068 | A1 * | 1/2023 | Naderyan | B81B 3/007 |

FOREIGN PATENT DOCUMENTS

KR 20100086783 A 8/2010

OTHER PUBLICATIONS

International Search Report and Written Opinion issued in App. No. PCT/US2025/011691, dated May 9, 2025, 10 pages.

* cited by examiner

*Primary Examiner* — Carolyn R Edwards
*Assistant Examiner* — Julie X Dang
(74) *Attorney, Agent, or Firm* — Blueshift IP, LLC; Cynthia M. Gilbert

(57) ABSTRACT

An improved capacitive transducer includes a metal disc comprising a plurality of channels milled onto the surface of the metal disc. The improved capacitive transducer includes a diaphragm membrane tensioned parallel to the metal disc, the diaphragm membrane at a distance to the metal disc.

11 Claims, 5 Drawing Sheets

200

200

200

200

200

200

CAPACITIVE TRANSDUCER

CROSS-REFERENCE TO RELATED APPLICATIONS

This application claims priority from U.S. Provisional Patent Application No. 63/621,451, filed on Jan. 16, 2024, entitled "Improved Capacitive Transducer," which is hereby incorporated by reference.

BACKGROUND

The disclosure relates to capacitive transducers. More particularly, the capacitive transducer described herein provides, amongst other features, an improved signal to noise ratio, ease of production and manufacture, and/or improved throughput.

Conventionally, a capacitive transducer (herein referred to as "capsule" or a "mic capsule") can reproduce a range of frequencies and amplitude useful for audio reproduction. As will be understood by those of skill in the art, conventional microphone capsules receive acoustic waves as input and translate the acoustic waves into electrical signals of varying voltage using a system including a spring and a stationary plate generating a variable capacitor. The frequency response and output are the sum of the elements-distance from the plate to the spring, for example. An acoustic network may be achieved by a disc having a plurality of precisely milled holes. However, improvements are needed to influence noise, frequency response, and signal sensitivity of capsules but such parameters are not so modified in conventional capsules.

BRIEF DESCRIPTION

In one aspect, an improved capacitive transducer includes a metal disc comprising a plurality of channels milled onto the surface of the metal disc. The improved capacitive transducer includes a diaphragm membrane tensioned parallel to the metal disc, the diaphragm membrane at a distance to the metal disc.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The improved capacitive transducer described herein may include a modified set of design parameters, resulting in an improved signal to noise ratio, ease of production and manufacture, and/or improved throughput. The improved capacitive transducer may be referred to herein as a "capsule."

Conventionally, a capsule typically includes a metal disc of a given thickness (which may also be referred to herein as a plate), a plurality of precision blind holes in the metal disc, and a diaphragm tensioned parallel to the disc at a distance from the metal disc. Capsules may include one or more through holes in the metal disc. There may be a voltage potential between the diaphragm and metal disc. The diaphragm may be referred to as a membrane or as a diaphragm membrane. The capsule may include functionality for isolation of any direct electrical connection between the diaphragm and the metal disc, such that only the Coulomb force remains between them. The capsule may have either a polarized metal disc or a polarized diaphragm, via a fixed direct current (DC) voltage.

Design parameters may have influence over the noise, frequency response, and signal sensitivity of capsules. These parameters are defined, and controlled, by physical and electrical quantities. Combined, these parameters create a variable capacitor, which is, is conventionally, defined by the conductor made from the charged element and the non-charged element separated by a dielectric. The displacement of the charged voltage potential via the diaphragm relative to the metal disc is instigated by an external sound source (which itself may be an alternating pressure field), said displacement is damped by the mass of air between them and the tension of the diaphragm. The mass of air is established by the distance from the diaphragm to the metal disc in combination with the precision blind holes in the metal disc. With these parameters, the capsule may identify a change in a level of pressure in the pressure field by the displacement. The output of this variable capacitor is an electrical signal, a varying alternating current (AC) voltage.

The above parameters however may be reduced to their fundamental functions and, as described in further detail below, the blind holes may be considered to be a means for providing an isometrically distributed volume of air, which is a lumped physical quantity—as long as the ratio between the lumped physical and electrical quantities remains substantially stable, one can achieve a threshold level of performance characteristics. This means that the physical implementation of these parameters does not need to be accomplished in the manner conventionally used. Consequentially, the parameter of the air mass can be represented not only by a series of holes, but by any series of negative/reductive manufacture that results in the same volume and surface area of at least semi-isometric distribution to a traditionally manufactured capsule.

Figure 1A:
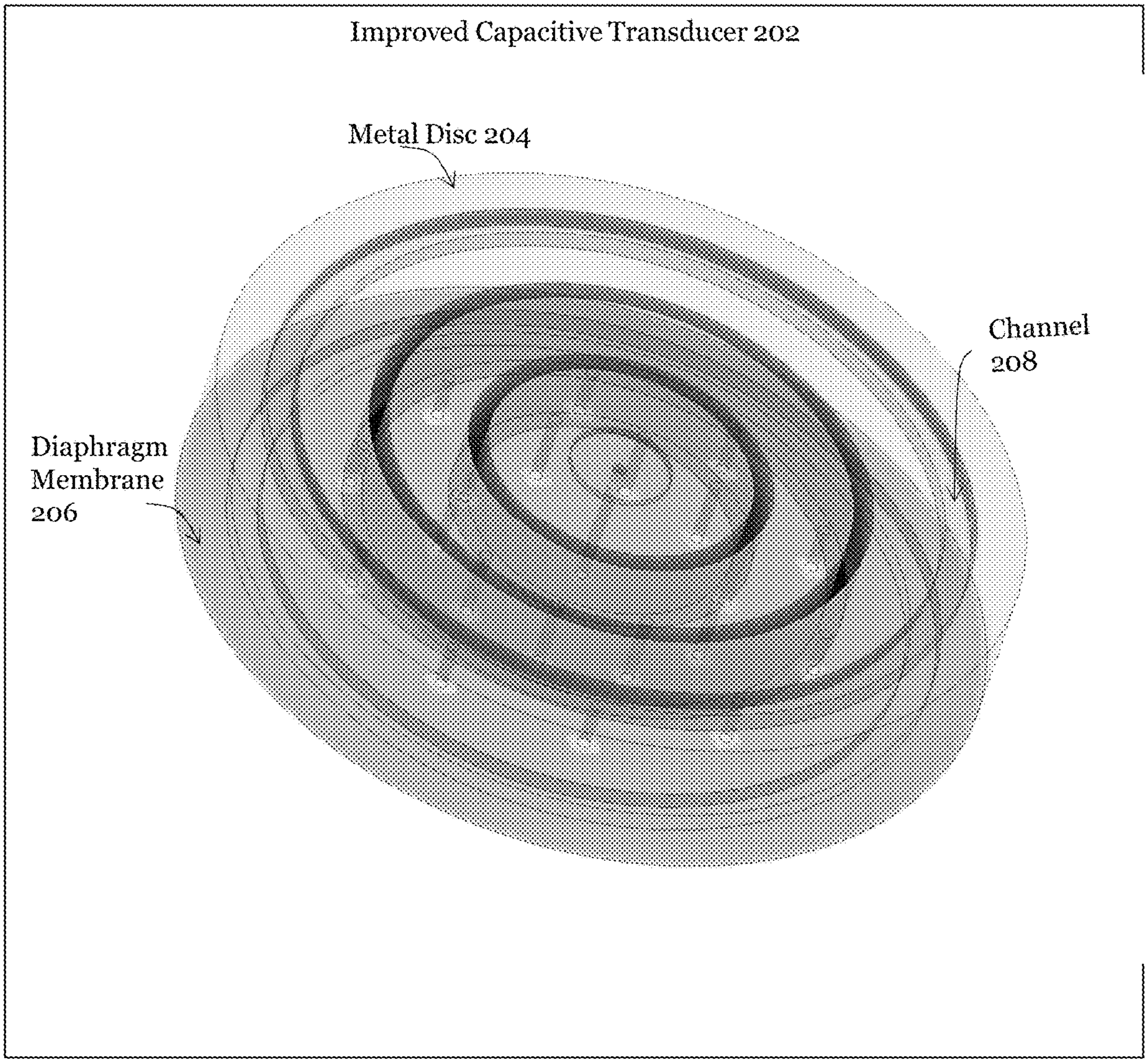
FIG. 1A is a block diagram depicting an embodiment of an improved capacitive transducer.

FIG. 1A depicts one embodiment of a system 200 including an improved capacitive transducer 202. The improved capacitive transducer 202 includes a metal disc 204 comprising a plurality of channels 208 milled onto the surface of the metal disc. The improved capacitive transducer 202 includes a diaphragm membrane 206 tensioned parallel to the metal disc, the diaphragm membrane 206 at a distance to the metal disc 204.

The metal disc 204 may include a plurality of channels 208 milled on the surface of the metal disc as rings. The metal disc 204 may include a plurality of channels 208 milled on the surface of the metal disc as squares. The metal disc 204 may include a plurality of channels 208 milled on the surface of the metal disc as triangles. The metal disc 204 may include a plurality of channels 208 milled on the surface of the metal disc as concentric channels (in any shape). The metal disc 204 may include a plurality of channels 208 milled on the surface of the metal disc as concentric channels and at least one through hole angled along an axial dimension. A first of the plurality of channels 208 may be radially symmetric to a second of the plurality of channels. The plurality of channels 208 does not traverse to, or terminate to, the rear. A first surface of the metal disc 204 between a first and a second of the plurality of channels 208 may have a first height and a second surface of the metal disc 204 between a third and a fourth of the plurality of channels 208 may have a second height.

The metal disc 204 may have a convex profile to the diaphragm membrane 206. The diaphragm membrane 206 may act on a first of the plurality of channels 208 in a first manner and act on a second of the plurality of channels 208 in a second manner.

As will be understood by those of skill in the art, the metal disc 204 may be a fixed plate attached to the diaphragm membrane 206. The diaphragm membrane 206 may vibrate (for example, when impacted by a sound wave).

Figure 1B:
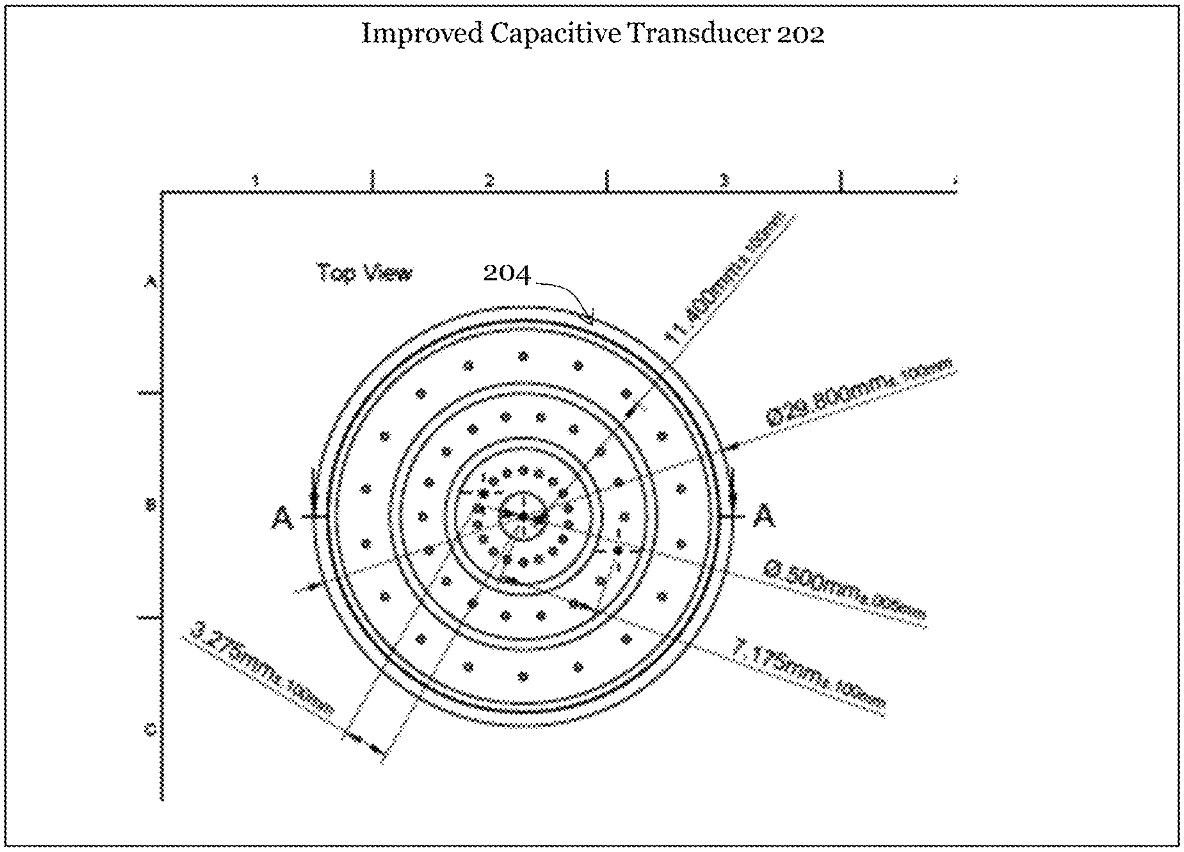
FIG. 1B is a block diagram depicting a top view of an embodiment of an improved capacitive transducer.
Figure 1C:
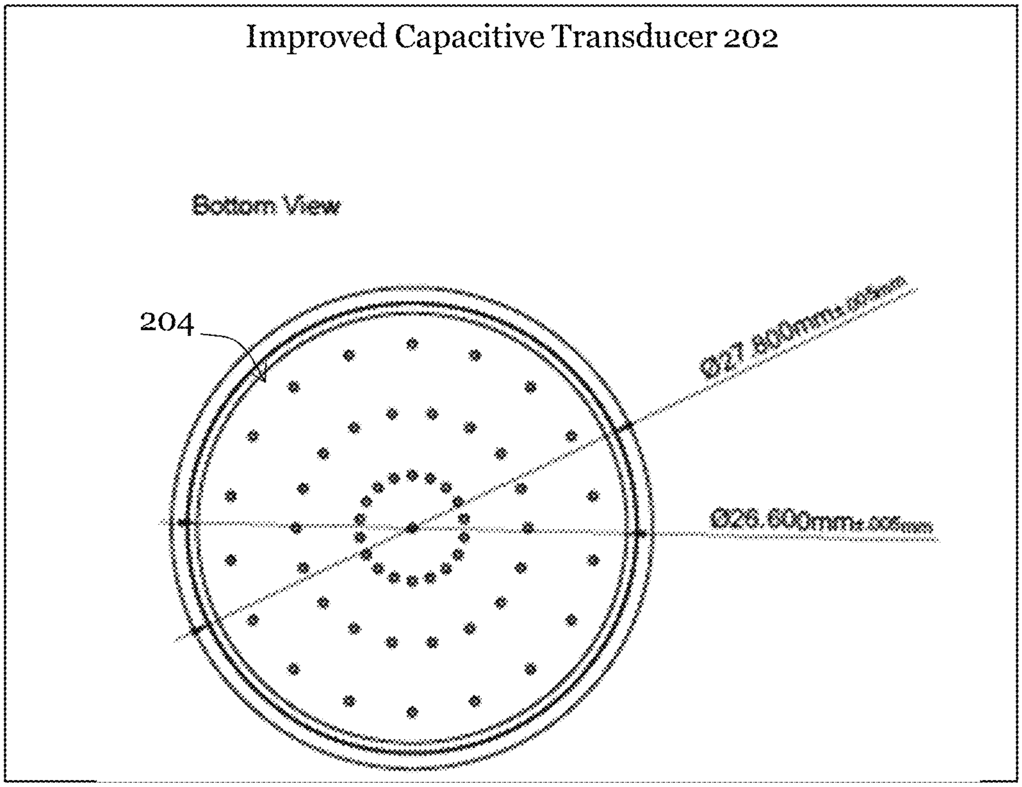
FIG. 1C is a block diagram depicting a bottom view of an embodiment of an improved capacitive transducer.
Figure 1D:
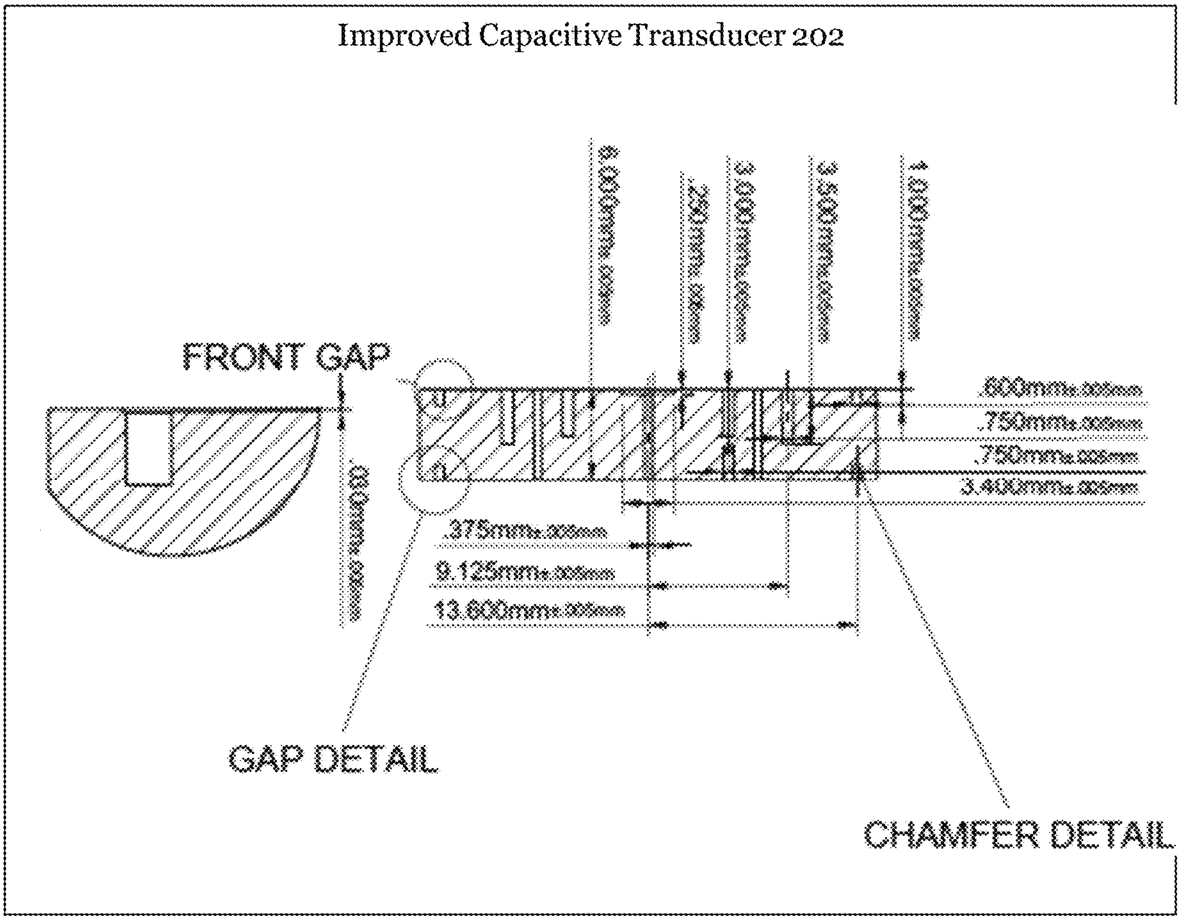
FIG. 1D is a block diagram depicting an embodiment of an improved capacitive transducer.

FIG. 1B is a top view of one embodiment of the improved capacitive transducer 202 and depicts the metal disc 204. FIG. 1C is a bottom view of one embodiment of the improved capacitive transducer 202 showing the metal disc 204. FIG. 1D is a view of one embodiment of the improved capacitive transducer 202 showing the details of the gaps in the metal disc 204.

Referring back to FIG. 1A, in one embodiment of the improved capacitive transducer 202 as described herein, the blind holes in a metal disc may be replaced by a plurality of channels 208. Given that a charged membrane acts on a portion of the disc having a hole in a different manner than it acts on a portion of the disc not having a hole, there is a redistribution of the electricity resulting in a number of benefits. Given that the damping can occur in concert with the membrane in the improved capacitive transducer 202, the result is more linear and provides an improved signal to noise ratio. Another benefit of modifying the capsule in this way is improved throughput.

The improved capacitive transducer 202 may implement a network of electrical and acoustic properties that constrain the parameters of the improved capacitive transducer 202 and which are inter-dynamic. The improved capacitive transducer 202 may provide additional benefits when the channels in the plurality of channels 208 are placed as concentric rings. Modal acoustic compliance control may, for example, be provided if the plurality of channels 208 (e.g., lumped parameters) takes the form of concentric rings. Radially symmetric channels in the plurality of channels 208 provide damping that aligns in position with a number of the inherent radial vibrational modes of a circular membrane suspended circumferentially of a given diameter, since the radial modes are non-pistonic in relation to the diaphragm's overall motion. By subdividing certain modes via acoustically loading the diaphragm membrane 206 in more discrete areas radially, the modal acoustic compliance control may also be provided. Additionally, the modal acoustic compliance control may be provided by acoustically loading the diaphragm membrane 206 radially over the regions of increasing tension from the center to edge.

Thus, by having damping in the areas of non-pistonic motion, the improved capacitive transducer 202 may reduce the ratio of non-pistonic motions relative to the pistonic motions. This results because the radial modes may be non-pistonic locally in relation to an overall motion globally of the diaphragm membrane 206, which results in non-linearities relative to the sound impinging on the diaphragm membrane 206 at normal-incident. These non-linearities result in some contribution to total harmonic distortion and noise because they are not representative of the pressure wave/sound's displacement; they are a biproduct of a system under tension. A diaphragm membrane 206 that is a circular microphone diaphragm membrane clamped at its perimeter vibrates in modes described (in classic membrane theory) by Bessel functions and zeros of these functions in the radial and angular directions. The fundamental (0,1) mode (sometimes notated as J0 or the "first circular mode") is one in which the center moves in-phase while the edges remain fixed. Higher modes include more nodal circles or nodal diameters. One embodiment of an equation for a vibrating circular membrane (e.g., the diaphragm membrane 206) may be described by: $\nabla^2\psi+k^2\psi=0$. In cylindrical coordinates $(r,\theta,t)$, this becomes: $(1/r)(\partial/\partial r)(r\theta\psi/\partial r)+(1/r^2)(\partial^2\psi/\partial\theta^2)+k^2\psi=0$. The general solution takes the form: $\psi(r,\theta,t)=[AJm(kr)+BYm(kr)][C\cos(m\theta)+D\sin(m\theta)]\exp(i\omega t)$ Where Jm is the Bessel function of the first kind, order m, Ym is the Bessel function of the second kind, order m k is the wavenumber ($k=\omega/c$), $\omega$ is the angular frequency, and m is the number of nodal diameters. For a fundamental mode (0,1) where m=0 (no nodal diameters) the equation may use J0 (Y0 is discarded due to singularity at r=0) and the solution simplifies to: $\psi(r,t)=AJ0(kr)\exp(i\omega t)$. The resonant frequencies may be determined by applying the equation $fmn=(\alpha mn/2\pi a)\sqrt{(T/\rho)}$ where: $\alpha mn$ is the nth zero of the mth order Bessel function a is the radius of the diaphragm membrane 206, T is tension per unit length, and p is surface density. When the diaphragm membrane 206 vibrates in its fundamental mode (J0), the vibration creates pressure variations that couple into the channels in the plurality of channels 208. The equation describing this coupling takes the form $p(r,\theta,t)=\rho c^2[\partial\psi(r,\theta,t)/\partial t]$. This pressure variation drives air flow into and out of the channels in the plurality of channels 208. Even when not at resonance, the channels in the plurality of channels 208 present an acoustic impedance to this flow $Z\_ring=R\_acoustic+j\omega M\_acoustic+1/(j\omega C\_acoustic)$, where R_acoustic represents viscous losses, M_acoustic is the acoustic mass of the ring opening, and C_acoustic is the compliance of the ring cavity. A microphone capsule is not just a membrane in free air; it is coupled to an enclosed (or partially vented) back volume with distributed acoustic resistance and compliance. The distribution of that back-volume compliance, resistance, and mass loading can shift, split, or damp the natural modes of the diaphragm membrane 206.

The cross sectional area of the channels in the plurality of channels 208 confers acoustic resistance/compliance. These channels in the plurality of channels 208 reorganize that compliance into more pronounced radial zones, which can have a greater effect on how each radial segment of the diaphragm moves. Each channel in the plurality of channels 208 has its own acoustic volume. Because these volumes are larger than the commonly encountered small blind holes, the local compliance behind each radial zone of the diaphragm membrane 206 is different from a design that uses many small blind holes scattered more evenly. When the diaphragm membrane 206 deflects in a higher-order mode (for instance, a mode with one or more nodal rings in the radius), each zone can respond somewhat independently. In some embodiments therefore, the channels in the plurality of channels 208 of the lumped element arrangement of the improved capacitive transducer 202 may be less prone to potential harmful resonances because they are not closed cylinders/blind holes of small volumes.

The blind holes traditionally used will, as any cavity will, resonate at a frequency related to their size, shape, and material. In the case of commonly encountered microphone capsules this can range from 13 kiloHertz to beyond 20 kiloHertz. Resonances are inherently defined as an oscillation, and in this context and application, the oscillation results in an undesirable frequency specific magnitude deviation. The "Q factor" of these conventional resonances, usually defined as how undamped this oscillation is plus the ratio of the resonator's center frequency to its bandwidth, is fairly high. Thus, they lose energy slowly and have a relatively large center frequency to bandwidth ratio. These quantities are also potentially more non-linear due to the tighter grouping/smaller physical spacing of traditional closed cylinders. This encourages coupling between each resonant cylinder via the enclosed air gap from the disc they all exit into (e.g., because the diaphragm membrane 206 is tensioned parallel to the metal disc 204 at a distance), which produces a further amplification of said resonant frequency because the blind holes are all of the same size and shape. Thus, conventional blind holes will resonate at the same frequency and Q factor. Given that, in order to produce the acoustic impedances necessary, a large number of cylinders-up to several dozen in some cases—are conventionally necessary and this can result in an amplification of the resonant point by over 10×.

The improved capacitive transducer 202 described herein lowers the resonant frequency and reduces the Q factor, and said resonance is excited and amplified far less. This may be accomplished due to the fact that (i) there are orders of magnitude less total resonators/cylinders/blind holes and/or that there are fewer channels in the plurality of channels 208 necessary to accomplish the equivalent total volume of air compared to the number of small blind holes; (ii) that there are larger bending/radiation losses due to the larger continuous open area so the channels in the plurality of channels 208 are far larger than a single blind hole; and/or (iii) the resulting path length is longer. The improved capacitive transducer 202 described herein may be implemented with one or more channels in the plurality of channels 208 to accomplish a given acoustic impedance. Each channel in the plurality of channels 208 forms a closed path, thus the path length, in the case of a channel in the plurality of channels 208 being a ring, is longer than an individual blind hole, thus the resonance is lower in frequency, and since there are far less of them, there is far less coupling of said resonances. Given the continuous open area is larger, there will be a greater amount of radiative loss to the resonance of a particular channel in the plurality of channels 208. Thus, the resonance also has a lower Q factor. Additionally, if there is more than one channel in the plurality of channels 208 for a given desired design requirement, the resonances occur at different frequencies due to the respective channels' different diameters. Thus, there will be less coupling. The path length resonance may be determined as follows: $f=c/L$, where $L$=the total path length including end corrections. The Helmoltz Resonance may be determined as follows: $f=(c/2\pi)\sqrt{(A/VL')}$ where $A$=the opening area, $V$=the cavity volume, $L'$=the effective length including end corrections, and $c$=the speed of sound (≈343 m/s at 20° C.). On average, the improved capacitive transducer 202 may provide a 3 dB reduction in resonant peak SPL from a 1 Pascal sound source, planar and normal incident to the improved capacitive transducer 202. This is based on calculating the incident sound power on the disc/transducer producing a pressure boost to said resonant frequency. The pressure amplitude in a resonator at resonance can be up to ~Q times the driving-pressure amplitude inside the cavity. Therefore, a theoretically reasonable estimate can be determined via the following calculation: $P_{resonant}=P_{incident}\times A_{total}\times C_{coupling}\times C_{viscous}\times C_{interaction}$, where basic resonant pressure ($P_{resonant}$): $P_{resonant}=P_{incident}\times Q\times N_{effective}$, and where $P_{incident}$=incident pressure (1 Pa at 94 dB SPL), $Q$=quality factor (30-40, adjusted for losses), $N_{effective}$=effective number of resonators contributing. A total amplification factor ($A_{total}$) may be determined as $A_{total}=Q_{effective}\times\eta_{radiation}$ where, $Q_{effective}=Q\times(1-\alpha_{losses})$, $\alpha_{losses}$=viscous and thermal losses coefficient, $\eta_{radiation}$=radiation efficiency factor. A coupling coefficient ($C_{coupling}$) may be determined using: $C_{coupling}=(1-\Gamma)\times\eta_{impedance}$ where $\Gamma$=reflection coefficient at resonator entrance and $\eta_{impedance}$=impedance matching efficiency. A viscous boundary layer effects ($C_{viscous}$) may be determined via: $C_{viscous}=\exp(-\alpha_v\times L)$ where $\alpha_v$=viscous attenuation coefficient, $L$=resonator length $\alpha_v=(\omega/2c)\times\sqrt{(2\mu/\rho\psi)}$, $\omega$=angular frequency, $\mu$=dynamic viscosity of air, and $\rho$=air density. An interaction factor ($C_{interaction}$) may be determined: $C_{interaction}=1/(1+\beta\times(N-1))$ where $\beta$=coupling coefficient between adjacent resonators and $N$=total number of resonators. The complete equation then becomes: $P_{total}=P_{incident}\times Q_{effective}\times(1-\Gamma)\times\exp(-\alpha_v\times L)\times[1/(1+\beta\times(N-1))]\times\eta_{radiation}-\eta_{impedance}$. Resonances may be accounted for in the designer's calculations but having the lumped elements represented as channels in the plurality of channels 208 relaxes this additional consideration significantly.

The improved capacitive transducer 202 can reduce the overall Q factor of specific diaphragm modes because the channels in the plurality of channels 208 provide an inherent compliance boundary at each channel radius, instead of letting the entire back volume respond uniformly. By subdividing the back-cavity radially, the design of the improved capacitive transducer 202 can reduce center to edge over-deflection and provide compliance that transitions radially throughout the diaphragm membrane 206, acoustically loading in concert with diaphragm tension radially, given that the center is at the lowest tension and the circumference is at the highest tension. As an example, a channel in the plurality of channels 208 having a configuration 5.22 mm and 9.12 mm radii, how the configuration affects different membrane modes can be determined as follows: Using fundamental J0 mode creates a pressure distribution that varies with radius as $p(r)\propto J0(\alpha01r/a)$; at a channel radii with an inner ring ($r1$=5.22 mm), $p1\propto J0\,(2.405r1/a)$ and with an outer ring ($r2$=9.12 mm), $p2\propto J0\,(2.405r2/a)$. The power dissipated by each channel/ring is $P_{dissipated}=|p^2|/2R_{acoustic}$. This creates a damping effect that is proportional to the square of the local pressure amplitude. Having two rings at different radii will intercept the membrane modes at different points in their spatial pattern. The total damping effect can be expressed as a modal damping ratio: $\zeta mn=(P_{dissipated})/(4\pi fmnEmn)$, where $fmn$ is the modal frequency and where $Emn$ is the modal energy. Thus, by having compliance control in discrete, yet radially symmetric areas, the improved capacitive transducer 202 can reduce non-pistonic motions relative to the pistonic motions and the viscous losses in the plurality of channels 208 may add beneficial damping without requiring precise tuning, resulting in a reduction in total harmonic distortion.

An additional benefit of modifying the improved capacitive transducer 202 as described herein is an increased ease of production/manufacture. Since the plurality of channels 208 (e.g., concentric rings) milled on to the metal disc 204 need not be as precisely milled as conventional holes, the manufacture of the metal disc 204 takes less time on a mill and requires less precision, increasing the ease of manufacture. A pattern on the metal disc 204 is determined by the depth of the metal disc 204 and by drilling the pattern of the plurality of channels 208 instead of the holes, one may achieve more efficient and improved placement of the plurality of channels 208.

When the metal disc 204 includes a plurality of channels 208 that are a plurality of concentric rings, the plates of the non-ring sections of the disc may have ledges of differing heights. When the metal disc 204 has a convex profile to the diaphragm membrane 206 and as the diaphragm membrane 206 moves, it displaces parabolically because it is tensioned on the edges (i.e., is not in parallel to the disc). By modifying the profile of the metal disc 204 and therefore modifying whether or not (or how much) the metal disc 204 and the diaphragm membrane 206 are in parallel with each other, one may design a improved capacitive transducer 202 to have more or less capacitance. Such an improved capacitive transducer 202 may provide additional benefits due to the metal disc 204 being concave to the diaphragm membrane 206 at rest, thus becoming more parallel upon displacement, the non-channeled areas of the disc now become planned and can be at different elevations relative to the diaphragm and each other, resulting in an overall concave profile for the metal disc 204 because the improved capacitive transducer 202 is inherently non-linear in its charge to capacitance relationship. The mechanism of its non-linearity may be multi-modal. One mode may be inherent to the improved capacitive transducer 202 functioning as a variable capacitor and inherent to its function. It is a voltage dependent non-linearity because the charged element (i.e., the voltage potential between the diaphragm membrane 206 and the metal disc 204) and the diaphragm membrane 206 is displaced in relationship to the non-charged element (the metal disc 204), and thus the capacitance is changing in relationship to a fixed voltage; hence, its charge-to-discharge rate changes based on input and output to a mating circuit. A different mode of non-linearity is due to the fact that the diaphragm membrane 206 is fixed along its circumference, thus its displacement relative to the metal disc 204 is not parallel when viewed from its profile. Thus, its capacitance is reduced over area from the center outwards towards its circumference during the introduction of stimulus and the center of diaphragm membrane 206 is displaced more relative to its edges. The result of this nonlinearity is additional noise via mechanical electrical conversion noise, which is the random thermal noise inherent to the capsule being modulated by non-linear capacitance. It is also harmonic distortion: as the gap changes in a non-linear fashion with pressure, the voltage-charge relationship acquires non-linear terms, which can generate harmonic products of the fundamental frequency. Both of these nonlinearities increase with SPL, accelerating nonlinearly. Creating a concave profile to the metal disc 204 introduces an inverse physical relationship between the metal disc 204 and the diaphragm membrane 206 based on its displacement; the metal disc 204 is maximally nonparallel at rest, inherently there is no displacement, and thus no input signal, so its non-parallel property is irrelevant. Upon the introduction of stimulus, a positive pressure wave will displace the diaphragm membrane 206 in the direction towards the metal disc 204. Thus, the diaphragm membrane 206 and the metal disc 204 become progressively more parallel, thus reducing one of the modes of capacitive non linearity.

The following equation describes one embodiment of a flat backplate capacitance variation: $C\_flat(r,\theta,t)=\varepsilon 0\cdot dA/[d0+x(r,\theta,t)]$, where $\varepsilon 0$=vacuum permittivity ($8.854\times10^{-12}$ F/m), $dA=r\cdot dr\cdot d\theta$ (differential area element), d0=initial gap distance at rest, $x(r,\theta,t)=x\_max[1-(r/R)^2]2\cdot\cos(\omega t)$, x_max=maximum displacement amplitude, R=diaphragm radius, and @=angular frequency. In such an embodiment, the total capacitance may be described as $C\_total\_flat(t)=\int 0^{2P}\int 0^{R}\ C\_flat\ (r,\theta,t)\cdot r\cdot dr\cdot d\theta$.

The following equation describes one embodiment of a concave backplate capacitance variation: $C\_concave(r,\theta,t)=\varepsilon 0\cdot dA/[d0+k(r/R)^2-x(r,\theta,t)]$, where, k=concavity factor, and all other variables are the same as for the flat backplate capacitance variation. In such an embodiment, the total capacitance: $C\_total\_concave(t)=\int 0^{2P}\int 0^{R}\ C\_concave(r,\theta,t)\cdot r\cdot dr\cdot d\theta$ and he concavity profile function may be given by $d\_concave(r)=d0+k(r/R)^2$.

The capacitive linearity analysis may be determined by identifying a linearity error for flat backplate such that $E\_flat(r,t)=|C\_flat(r,\theta,t)-C\_ideal(r,\theta,t)|/C\_ideal(r,\theta,t)$, where $C\_ideal(r,\theta,t)=\varepsilon 0\cdot dA/d0\cdot(1-x(r,\theta,t)/d0)$. The linearity error for the concave backplate may be given by $E\_concave(r,t)=|C\_concave(r,\theta,t)-C\_ideal(r,\theta,t)|/C\_ideal(r,\theta,t)$. The total RMS linearity error may be given by determining that $E\_RMS=\sqrt{}[\int 0^{2P}\int 0^{R}\ E^2(r,t)\cdot r\cdot dr\cdot d\theta/(\pi R^2)]$. The mechanical-electrical conversion noise power may be determined as follows: $N\_ME=4kT\cdot Re\{Z\_ME\}\cdot\Delta f$, where k=Boltzmann constant ($1.380649\times10^{-23}$ J/K), T=absolute temperature in Kelvin, $\Delta f$=bandwidth of interest, Z_ME=mechanical-electrical coupling impedance and where Z_ME is defined as $Z\_ME=(\partial C/\partial x)^2/(j\omega C^2)$.

For a flat backplate, $\partial C\_flat/\partial x=-\varepsilon 0\cdot dA/[d0+x(r,\theta,t)]^2$. For a concave backplate $\partial C\_concave/\partial x=-\varepsilon 0\cdot dA/[d0+k(r/R)^2-x(r,\theta,t)]^2$. Thus, the Signal-to-Noise Ratio (SNR) may be defined as $SNR=20\cdot\log\ 10(V\_signal/V\_noise)$, where $V\_signal=Q\cdot\partial(1/C)/\partial x\cdot x\_rms$, $V\_noise=\sqrt{}(N\_ME\cdot R\cdot\Delta f)$, Q=bias charge, R=load resistance. The Total Harmonic Distortion (THD) for small displacements may be determined for flat backplates as $THD\_flat\approx(x\_max/d0)^2/4$ and for concave backplates as $THD\_concave\approx(x\_max/do)^2/4\cdot[1-k/(2d0)]$. For optimal concavity, the following may be applied $k\_opt=2d0\cdot(x\_max/d0)^2$, thus reducing one of the modes of capacitive non linearity. This benefit of an embodiment of the improved capacitive transducer is the ability to introduce a controlled non-linearity that compensates for (e.g., controls for) an unavoidable system non-linearity.

As noted earlier, capacitive non-linearity is also caused by the mechanism of varying capacitance/charge over a fixed voltage. The linear relationship of $Q=CV$ and $E=\frac{1}{2}V$ squared no longer applies because that relationship was derived with an assumption of constant capacitance. Instead, capacitance is herein defined as the rate of change of charge with respect to voltage and the voltage is defined as the measure of change in energy per unit of charge. Therefore, the more fundamental relationship is $C=dQ/dV$ and $V=dE/dQ$. Thus, for changing capacitance(s), it can be derived by integrating capacitance and charge respectively over voltage. This is true in the case of a varying capacitor transducer.

In a traditional capsule, the through holes in the disc that create the acoustic delay network must be placed to avoid intersection with the blind holes that provide damping and restorative force to the diaphragm, lest the system perform poorly and or unpredictably. This leads to either one of two choices due to competing physical factors based on the above: 1) maximum rejection: requires larger holes, but this limits placement and number, thus reducing pattern/rejection consistency. 2) pattern consistency: requires more holes, but this requires them to be smaller, reducing absolute rejection; both of these require radial symmetry to be optimal. Conventionally, a balance is attempted to be obtained through the following: a grid-like through hole pattern, which has an inherent asymmetry relative to the paths due to the circular shape of the disc, but it has a large number of smaller holes in an attempt to compensate and increase pattern consistency. This costs absolute rejection as well as directional stability over polar angle and also has an additional effect of asymmetric acoustic loading for the diaphragm due to different areas having relatively large differences in closed area to open area. Or, if a more radially symmetric arrangement can be achieved (e.g., concentric rings), there is a larger constraint to the number, diameter, and placement—while the holes can be larger, they are less numerous, which still reduces the efficacy of absolute rejection, and some cost is still lost from pattern consistency. Parameters include, without limitation mass of the diaphragm, mechanical resistance of the diaphragm, mechanical compliance of the diaphragm, effective are of the diaphragm, front acoustic impedance, back acoustic impedance, air density, speed of sound, static capacitance, polarization voltage, load resistance, rest gap distance, front incident pressure, pressure at the back of the diaphragm after delay paths, angle of incidence, angular frequency, effective delay time through acoustic paths, total area of holes, acoustic mass of holes, and acoustic resistance of holes. All of these factors interact in such a way as to effect acoustic impedance, and thus transient response/high frequency extension. Thus, a compromise must always be had, and the designer must account for this.

The improved capacitive transducer 202 described herein allows for flexibility over substantially all parameters. The improved capacitive transducer 202 described herein produces a larger open area for optimal choice of through hole parameters such as diameter, placement and number. All open areas available are radially symmetric if the lumped parameter channels take the form of concentric rings, providing larger control over, and direct improvement of, directional quantities. As a result, the usually encountered constraints are relaxed. Therefore, the improved capacitive transducer described herein introduces an improvement to the acoustic network/labyrinth to optimize directional characteristics. Configurations include, without limitation, concentric rings of through holes, concentric rings of varying through hole diameter, concentric rings of angled through holes along the axial path increasing the effective path length, and any combination of all of the above.

Figure 1E:
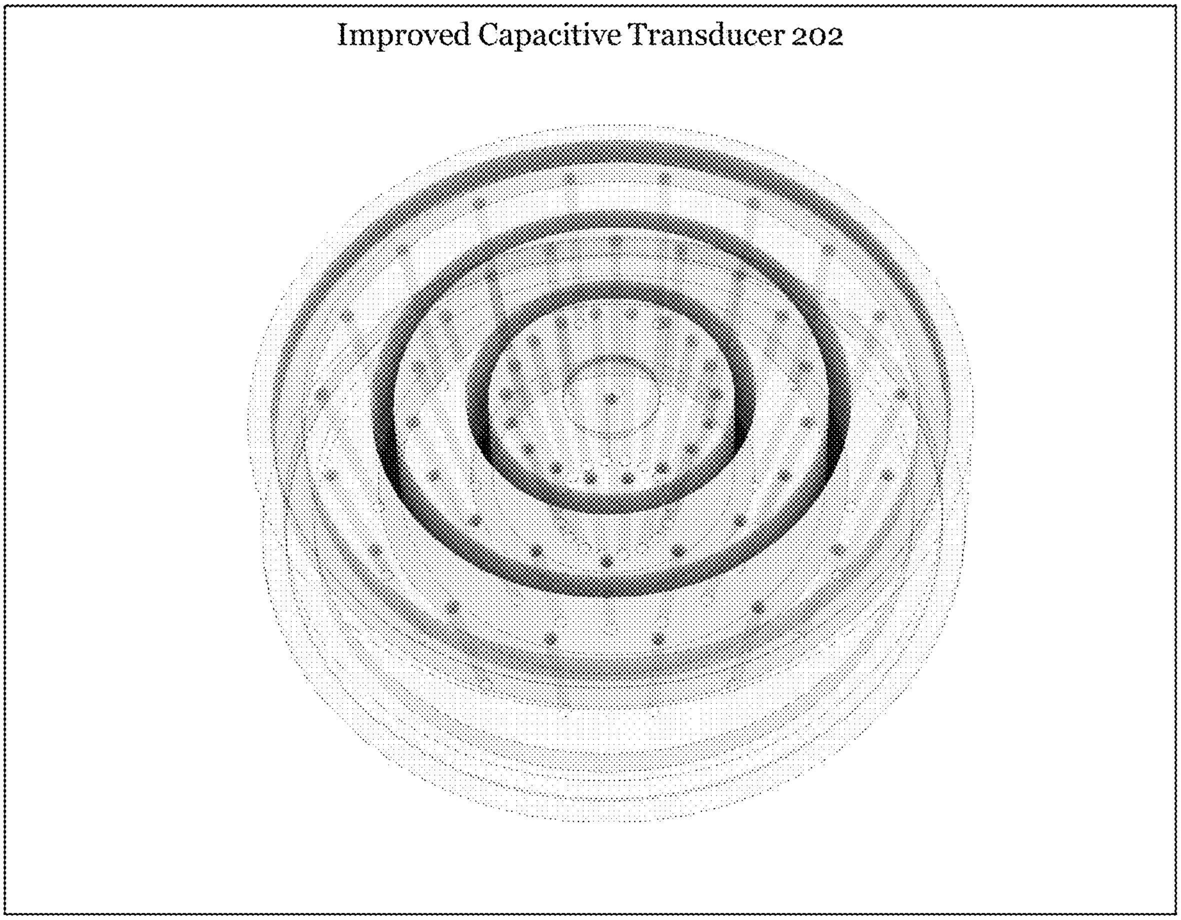
FIG. 1E is a block diagram depicting an embodiment of an improved capacitive transducer having at least one concentric ring and at least one through hole angled along an axial path.

Referring back to FIG. 1A, the diagram depicts one embodiment of an improved capacitive transducer 202 with a radially symmetric arrangement of through holes penetrating axially through the thickness/depth of the improved capacitive transducer 202. However, in some embodiments, the arrangement of through holes leaves available solid area that could be used for additional through holes. Therefore, and referring now to FIG. 1E, the concentric rings of through holes are angled along the axial path. This cannot be accomplished in traditional capsule architecture due to the through holes intersecting either each other or blind holes but can be implemented in the improved capacitive transducer 202.

For any given desired volume of air, resultant surface area, and ratio to non-reductive manufactured portions of the disc/plate, the parameter of acoustic damping can be distributed in any manner that fulfills said parameters of an equivalently machined traditional capsule. Thus, a novel and improved capacitive acoustic transducer is introduced. Physical and associated electrical non linearities can be reduced by taking advantage of the novel channeled air damping network. The necessary mathematical functions for determining the air volume remain respective to the geometry. In this case a ring can be easily represented by a torus divided in half, and thus the calculation for a given ring becomes $V=(\pi r2)(2\pi R)/2$. Thus, other electrical properties are derived and related to the ratios of this volume to the other volumes and surface area of the transducer desired, as long as the resulting capacitance is isometrically distributed across the said transducer. An additional capacitive non-linearity, related to capacitive microphones systems, was demonstrated and a novel methodology is introduced to reduce said non-linearity.

Due to the lumped parameter being represented in the improved capacitive transducer 202 as channels, the improved capacitive transducer 202 confers a benefit of greater control over the acoustic viscosity and associated frictional losses below the system resonant frequency. This presents an opportunity to control frequency response by changing the diameter, depth, or opening width of the channels to change the resonant point. By changing the diameter, or depth, or opening width of the channel, the resonant point can be increased or decreased in frequency. These parameters can be affected independently of one another to produce different frequency responses, whereas the traditional blind holes they replace can only be altered in bore and/or stroke and/or number and number is limited due to the need for a certain number of through holes at a certain placement. Parameterized this way, there are tighter constraints due to individual blind holes having only two dimensions—depth/length and diameter/width—and they can only be affected separately and individually within the tighter constraints of their physical arrangement. Represented as the innovative channels via a lump sum element described herein, the improved capacitive transducer 202 provides far greater flexibility and can provide far greater options and/or performance in terms of self-noise and frequency response. The acoustic viscosity can be represented as described below. For viscous effects, a viscous boundary layer thickness is given by: $\delta v=\sqrt{(2\mu/\omega\rho)}$, where $\mu$=the dynamic viscosity of air ($\approx 1.81\times 10^{-5}$ Pa·s) and $\omega$=the angular frequency $\rho$=the density. The resonant point and the viscous loss/sensitivity can be adjusted with less overlap and influence of one upon the other. The above, used in conjunction with the above described path length resonance function, and acoustic compliance, mass, and "Vring" mathematical functions allows for design of an improved capacitive transducer 202 that affects the various characteristics with far greater granularity and improved acoustic performance through the lumped element channel system.

Therefore, as indicated above, the channels in the improved capacitive transducer 202 represent and/or contain the mass of air that was once represented by drilled blind holes. The necessary mathematical functions for determining the air volume remain respective to the channel geometry. As one, non-limiting example, a ring can be derived, assuming a rectangular cross section, and the calculation for a given ring may be described as follows. Let the ring's mean radius (from its centerline) be R. Then, the ring's mean circumference is $C=2\pi R$. A diameter of the ring is 2R. Let the ring's rectangular cross section be described by a width W (often called the "opening" or "gap" dimension), a depth D, a cross-sectional area $A=W\times D$, and the volume of such a ring is therefore the cross-sectional area multiplied by the ring's mean circumference: $Vring=A\times C=(W\cdot D)\ (2\pi R)$. Thus the other electrical properties may be derived, and related, to the ratios of this volume to the other volumes and surface area of the transducer desired, as long as the resulting capacitance is isometrically distributed across the improved capacitive transducer 202. Presuming a ring/channel system as described above, for a volume of air, the acoustic compliance (Ca) is given by: $Ca=V/(\rho c^2)$ where V=the volume in $m^3$, ρ=the density of air (≈1.21 $kg/m^3$ at 20° C.), and c=the speed of sound (~343 m/s at 20° C.). For a ring opening, the acoustic mass may be determined as follows: $Ma=\rho(l+1.7r)/A$ where, l=the length of the opening, r=the radius of the opening, A=the cross-sectional area, and 1.7r represents the end correction.

Additional benefits may be achieved by radial symmetry of one or more optional through holes in addition to the configuration of the concentric channels in the plurality of channels 208. This can improve the symmetry (directional/pattern consistency), and efficiency (absolute rejection) of the sensing of the pressure gradient from the sound source from the front of the improved capacitive transducer 202 to the rear of the improved capacitive transducer 202, in the case that one desires directional characteristics. This directional characteristic may be accomplished by a cancellation of phase for a given frequency based on the thickness of the metal disc 204 and on the diameter of the metal disc 204. This may be accomplished by several through holes machined axially through the depth of the improved capacitive transducer 202. The combination of these parameters creates a network of acoustic impedances. Delaying the traversal of frequencies relative to one another. The relative magnitude stability over the phase transition (thus cancellation) traversing the paths (the network) associated with the capsule from normal/direct incident to 180 degrees of direct incident is determined by the placement and size of the through holes relative to the capsule. The channels in the plurality of channels 208 are less prone to potential Hemholtz resonances because they are no longer cylinders. While these resonances can occur outside the audible range, this is not guaranteed, or necessarily so, based on the design of the improved capacitive transducer 202. This has the potential to produce frequency magnitude variations. This is determined by multiple overlapping variables. Having the lumped parameter represented as channels in the plurality of channels 208 relaxes this additional consideration significantly. The channels in the plurality of channels 208 now represent the mass of air that was conventionally represented by drilled blind holes.

Given that it takes a fixed time, related to the path length associated with said network, for a given, respective, planar wave (sound) to reach the rear of the diaphragm the relationship of phase between the front and rear will be different. As the phase relationship changes, the diaphragm receives similar amplitude (but different phase) signals, causing the diaphragm to move less in response to this. Reducing its ability to sense the pressure difference from the front of the capsule to the rear. Eventually, the phase relationship from one side to the other is 180 degrees, but equal in magnitude, causing the diaphragm to not move at all, thus not responding to sound. This results in a gradual reduction of output AC voltage from the capsule in concert with the shifting phase over polar angle around the capsule until the voltage/output is, at least theoretically, zero causing a null in response, that leads to the capsule being more sensitive to sounds in a given direction. The size of the optional through holes has predominant control over the degree of absolute rejection. Within a given range, they will increase the efficacy of pressure sensing via a reduction of acoustic impedance until they become too large and are simply an open cavity. The number of the optional through holes has predominant control over the pattern consistency. The larger the number of optional through holes, the more consistent the phase relationship over frequency due to a larger number of paths distributed over the disc/capsule. It directly controls the stability of the directional characteristic over angle. The placement of the optional through holes controls (i) the effective path lengths from the front to the rear, (ii) the distribution of the pressure gradient across the diaphragm's surface, and/or (iii) the frequency response of said directional characteristic.

For any given desired volume of air, resultant surface area, and ratio to closed area aspects of the disc/plate, the parameter of the acoustic damping/spring network can be distributed in any manner that equates to said parameters of a traditionally machined traditional capsule. Thus, a novel and improved capacitive acoustic transducer is introduced that fulfills these constraints through a lumped sum of volume represented by the plurality of channels 208. The channels in the plurality of channels 208 can take various shapes, the examples described herein demonstrating concentric rings, although alternative channel cross section and shape geometries may be used. Directly resulting benefits unique to the use of the channels and derived from the lumped element method are accomplished by these modifications to conventional capsules.

Although described above in connection with circumferential rings in the plurality of channels 208, the improved capacitive transducer 202 may take the form of any of a number of different channel geometries and different channel profile shapes and need not be limited to simple geometric shapes. By way of example and without limitation the channel geometries may include circumferential rings relative to the disc, squares, triangles, closed-sided Euclidean shapes, or, by introducing curvatures into the profile of the channels when machining, non-Euclidean shapes.

Furthermore, although described above as a plurality of channels 208, in some embodiments, the improved capacitive transducer 202 has only one channel. In such an embodiment, the improved capacitive transducer 202 includes a metal disc 204 comprising a single channel milled onto the surface of the metal disc 204 and the improved capacitive transducer 202 includes a diaphragm membrane tensioned parallel to the metal disc, the diaphragm membrane at a distance to the metal disc. As indicated above, the channel may take the form of any of closed-sided Euclidean shape or, by introducing curvatures into the profile of the channels when machining, non-Euclidean shapes.

Having described certain embodiments of improved capacitive transducers, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. An improved capacitive transducer comprising:

a metal disc comprising a plurality of channels milled onto a surface of the metal disc, wherein a first surface of the metal disc between a first and a second of the plurality of channels has a first height and wherein a second surface of the metal disc between a third and a fourth of the plurality of channels has a second height; and a diaphragm membrane tensioned parallel to the metal disc, the diaphragm membrane at a distance to the metal disc.

2. The improved capacitive transducer of claim 1, wherein a first of the plurality of channels is radially symmetric to a second of the plurality of channels.

3. The improved capacitive transducer of claim 1, wherein the metal disc comprises a plurality of channels milled onto the surface of the metal disc as rings.

4. The improved capacitive transducer of claim 1, wherein the metal disc comprises a plurality of channels milled onto the surface of the metal disc as closed-sided Euclidean shapes.

5. The improved capacitive transducer of claim 1, wherein the metal disc comprises a plurality of channels milled onto the surface of the metal disc as concentric channels.

6. The improved capacitive transducer of claim 1, wherein the metal disc comprises a plurality of channels milled onto the surface of the metal disc as concentric channels and at least one through hole angled along an axial dimension.

7. The improved capacitive transducer of claim 1, wherein the diaphragm membrane acts on a first of the plurality of channels in a first manner and wherein the diaphragm membrane acts on a second of the plurality of channels in a second manner.

8. The improved capacitive transducer of claim 1, wherein the metal disc has a convex profile to the diaphragm membrane.

9. An improved capacitive transducer comprising:

a metal disc comprising a channel milled onto a surface of the metal disc, wherein a first surface of the metal disc between a first and a second of the plurality of channels has a first height and wherein a second surface of the metal disc between a third and a fourth of the plurality of channels has a second height; and a diaphragm membrane tensioned parallel to the metal disc, the diaphragm membrane at a distance to the metal disc.

10. The improved capacitive transducer of claim 9, wherein the metal disc further comprises a ring milled onto the surface of the metal disc.

11. The improved capacitive transducer of claim 9, wherein the metal disc further comprises a closed-sided Euclidean shape milled onto the surface of the metal disc.

* * * * *